United States Patent
Rochette et al.

(10) Patent No.: US 7,784,058 B2
(45) Date of Patent: Aug. 24, 2010

(54) COMPUTING SYSTEM HAVING USER MODE CRITICAL SYSTEM ELEMENTS AS SHARED LIBRARIES

(75) Inventors: Donn Rochette, Fenton, IA (US); Paul O'Leary, Kanata (CA); Dean Huffman, Kanata (CA)

(73) Assignee: Trigence Corp., Ottawa, Ontario (CA)

( * ) Notice: Subject to any disclaimer, the term of this patent is extended or adjusted under 35 U.S.C. 154(b) by 1293 days.

(21) Appl. No.: 10/946,536

(22) Filed: Sep. 21, 2004

(65) Prior Publication Data

US 2005/0066303 A1 Mar. 24, 2005

Related U.S. Application Data

(60) Provisional application No. 60/504,213, filed on Sep. 22, 2003.

(51) Int. Cl.
*G06F 9/22* (2006.01)
(52) U.S. Cl. .................. 719/310; 719/319
(58) Field of Classification Search .......... 719/310, 719/319
See application file for complete search history.

(56) References Cited

U.S. PATENT DOCUMENTS

| | | | | |
|---|---|---|---|---|
| 5,481,706 | A * | 1/1996 | Peek | 710/200 |
| 6,212,574 | B1 * | 4/2001 | O'Rourke et al. | 719/321 |
| 6,260,075 | B1 * | 7/2001 | Cabrero et al. | 719/310 |
| 2002/0004854 | A1 | 1/2002 | Hartley | |
| 2002/0174215 | A1 | 11/2002 | Schaefer | 709/224 |
| 2003/0101292 | A1 | 5/2003 | Fisher | |
| 2004/0025165 | A1 * | 2/2004 | Desoli et al. | 719/310 |

FOREIGN PATENT DOCUMENTS

| | | |
|---|---|---|
| WO | WO 02/06941 A | 1/2002 |
| WO | WO 2006/039181 A | 4/2006 |

OTHER PUBLICATIONS

U.S. Appl. No. 60/512,103, filed Oct. 20, 2003, Rochette et al.

* cited by examiner

*Primary Examiner*—Hyung S Sough
*Assistant Examiner*—Syed Roni
(74) *Attorney, Agent, or Firm*—Allen, Dyer, Doppelt, Milbrath & Gilchrist, P.A. Attorneys at Law (57) ABSTRACT

A computing system and architecture is provided that affects and extends services exported through application libraries. The system has an operating system having an operating system kernel having OS critical system elements (OSCSEs) for running in kernel mode; and, a shared library having critical system elements (SLCSEs) stored within the shared library for use by the software applications in user mode. The SLCSEs stored in the shared library are accessible to the software applications and when accessed by a software application forms a part of the software application. When an instance of an SLCSE provided to an application from the shared library it is ran in a context of the software application without being shared with other software applications. The other applications running under the operating system each have use of a unique instance of a corresponding critical system element for performing essentially the same function, and can be run simultaneously.

18 Claims, 7 Drawing Sheets

COMPUTING SYSTEM HAVING USER MODE CRITICAL SYSTEM ELEMENTS AS SHARED LIBRARIES

CROSS-REFERENCE TO RELATED APPLICATIONS

This application claims priority of U.S. Provisional Patent Application No. 60/504,213 filed Sep. 22, 2003, entitled "User Mode Critical System Element as Shared Libs", which is incorporated herein by reference.

FIELD OF THE INVENTION

This invention relates to a computing system, and to an architecture that affects and extends services exported through application libraries.

BACKGROUND OF THE INVENTION

Computer systems are designed in such a way that software application programs share common resources. It is traditionally the task of an operating system to provide mechanisms to safely and effectively control access to shared resources. In some instances the centralized control of elements, critical to software applications, hereafter called critical system elements (CSEs) creates a limitation caused by conflicts for shared resources.

For example, two software applications that require the same file, yet each requires a different version of the file will conflict. In the same manner two applications that require independent access to specific network services will conflict. A common solution to these situations is to place software applications that may potentially conflict on separate compute platforms. The current state of the art, defines two architectural approaches to the migration of critical system elements from an operating system into an application context.

In one architectural approach, a single server operating system places critical system elements in the same process. Despite the flexibility offered, the system elements continue to represent a centralized control point.

In the other architectural approach, a multiple server operating system places critical system elements in separate processes. While offering even greater options this architecture has suffered performance and operational differences.

An important distinction between this invention and prior art systems and architectures is the ability to allow a CSE to execute in the same context as an application. This then allows, among other things, an ability to deploy multiple instances of a CSE. In contrast, existing systems and architectures, regardless of where a service is defined to exist, that is, in kernel mode, in user mode as a single process or in user mode as multiple processes, all support the concept of a single shared service.

SUMMARY OF THE INVENTION

In accordance with a first broad aspect of this invention, a computing system is provided that has an operating system kernel having operating system critical system elements (OSCSEs) and adapted to run in kernel mode; and a shared library adapted to store replicas of at least some of the critical system elements, for use by the software applications in user mode executing in the context of the application. The critical system elements are run in a context of a software application.

The term replica used herein is meant to denote a CSE having similar attributes to, but not necessarily and preferably not an exact copy of a CSE in the operating system (OS); notwithstanding, a CSE for use in user mode, may in a less preferred embodiment be a copy of a CSE in the OS.

In accordance with the invention, a computing system for executing a plurality of software applications is provided, comprising:
an operating system having an operating system kernel having OS critical system elements (OSCSEs) for running in kernel mode; and,
a shared library having critical system elements (SLCSEs) stored therein for use by the software applications in user mode wherein some of the CSEs stored in the shared library are accessible to a plurality of the software applications and form a part of at least some of the software applications by being linked thereto, and wherein an instance of a CSE provided to an application from the shared library is run in a context of said software application without being shared with other software applications and where some other applications running under the operating system can, have use of a unique instance of a corresponding critical system element for performing essentially the same function.

In accordance with the invention, there is provided, a computing system for executing a plurality of software applications comprising an operating system having an operating system kernel having OS critical system elements (OSCSEs) for running in kernel mode; and,
1. a shared library having critical system elements (SLCSEs) stored therein for use by the software applications in user mode as a service distinct from that supplied in the OS kernel.
2. wherein some of the SLCSEs stored in the shared library are accessible to a plurality of the software applications and form a part of at least some of the software applications, and wherein a unique instance of a CSE provided to an application from the shared library is run in a context of said software application and where some other applications running under the operating system each have use of a unique instance of a corresponding critical system element for performing essentially the same function.

In some embodiments, the computing system has application libraries accessible by the software applications and augmented by the shared library.

Application libraries are libraries of files required by an application in order to run. In accordance with this invention, SLCSEs are placed in shared libraries, thereby becoming application libraries, loaded when the application is loaded. A shared library or dynamic linked library (DLL) refers to an approach, wherein the term application library infers a dependency on a set of these libraries used by an application.

Typically, the critical system elements are not removed from operating system kernel.

In some embodiments, the operating system kernel has a kernel module adapted to serve as an interface between a service in the context of an application program and a device driver.

In some embodiments, the critical system elements in the context of an application program use system calls to access services in the kernel module.

In some embodiments, the kernel module is adapted to provide a notification of an interruption to a service in the context of an application program.

In some embodiments, the interrupt handling capabilities are initialized through a system call.

In some embodiments, the kernel module comprises a handler which is installed for a specific device interrupt.

In some embodiments, the handler is called when an interrupt request is generated by a hardware device.

In some embodiments, the handler notifies the service in the context of an application through the use of an up call mechanism.

In some embodiments, function overlays are used to intercept software application accesses to operating system services.

In some embodiments, the critical system elements stored in the shared library are linked to the software applications as the software applications are loaded.

In some embodiments, the critical system elements rely on kernel services supplied by the operating system kernel for device access, interrupt delivery, and virtual memory mapping.

In some embodiments, the kernel services are replicated in user mode and contained in the shared library with the critical system elements. In the preferred embodiment the kernel itself is not copied. CSEs are not taken from the kernel and copied to user mode. An instance of a service that is also provided in the kernel is created to be implemented in user mode. By way of example, the kernel may provide a TCP/IP service and in accordance with this invention, a TCP/IP service is provided in user mode as an SLCSE. The TCP/IP service in the kernel remains fully intact. The CSE is not shared as such. Each application that will use a CSE will link to a library containing the CSE independent of any other application. The intent is to provide an application with a unique instance of a CSE.

In accordance with this invention, the code shared is by all applications on the same compute platform. However, this shared code does not imply that the CSE itself is shared. This sharing of code is common practice. All applications currently share code for common services, such services include operations such as such as open a file, write to the file, read from the file, etc. Each application has its own unique data space. This indivisible data space ensures that CSEs are unique to an application or more commonly to a set of applications associated with a container, for example. Despite the fact that all applications may physically execute the same set of instructions in the same physical memory space, that is, shared code space, the instructions cause them to use separate data areas. In this manner CSEs are not shared among applications even though the code is shared.

In some embodiments, the kernel services used by CSEs comprise memory allocation, synchronization and device access.

In some embodiments, the kernel services that are platform specific are not replicated, or provided as SLCSEs.

In some embodiments, the kernel services which are platform specific are called by a critical system element running in user mode. In some embodiments, a user process running under the computing system has a respective one of the software applications, the application libraries, the shared library and the critical system elements all of which are operating in user mode.

In some embodiments, the software applications are provided with respective versions of the critical system elements. In some embodiments, the system elements which are application specific reside in user mode, while the system elements which are platform specific reside in the operating system kernel. In some embodiments, a control code is placed in kernel mode.

In some embodiments, the kernel module is adapted to enable data exchange between the critical system elements in user mode and a device driver in kernel mode.

In some embodiments, the data exchange uses mapping of virtual memory such that data is transferred both from the critical system elements in user mode to the device driver in kernel mode and from the device driver in kernel mode to the critical system elements in user mode.

In some embodiments, the kernel module is adapted to export services for device interface.

In some embodiments, the export services comprise initialization to establish a channel between a critical system element of the critical system elements in user mode and a device.

In some embodiments, the export services comprise transfer of data from a critical system element of the critical system elements in user mode to a device managed by the operating system kernel.

In some embodiments, the export services include transfer of data from a device to a critical system element of the critical system elements in user mode.

According to a second broad aspect, the invention provides an operating system comprising the above computing system.

According to a third broad aspect, the invention provides a computing platform comprising the above operating system and computing hardware capable of running under the operating system.

According to a fourth broad aspect, the invention provides a shared library accessible to software applications in user mode, the shared library being adapted to store system elements which are replicas of systems elements of an operating system kernel and which are critical to the software applications.

According to a fifth broad aspect, the invention provides an operating system kernel having system elements and adapted to run in a kernel mode and to replicate, for storing in a shared library which is accessible by software applications in user mode, system elements which are critical to the software applications.

According to a sixth broad aspect, the invention provides an article of manufacture comprising a computer usable medium having computer readable program code means embodied therein for a computing architecture. The computer readable code means in said article of manufacture has computer readable code means for running an operating system kernel having critical system elements in kernel mode; and computer readable code means for storing in a shared library replicas of at least some of the critical system elements, for use by software applications in user mode.

The critical system elements are run in a context of a software application. Accordingly, elements critical to a software application are migrated from centralized control in an operating system into the same context as the application. Advantageously, the invention allows specific operating system services to efficiently operate in the same context as a software application.

In accordance with this invention, critical system elements normally embodied in an operating system are exported to software applications through shared libraries. The shared library services provided in an operating system are used to expose these additional system elements.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Embodiments of the invention enable the replication of critical system elements normally found in an operating system kernel. These replicated CSEs are then able to run in the context of a software application. Critical system elements are replicated through the use of shared libraries. A CSE is replicated by way of a kernel service being repeated in user space. This replicated CSE may differ slightly from its counterpart in the OS. Replication is achieved placing CSEs similar to those in the OS in shared libraries which provides a means of attaching or linking a CSE service to an application having access to the shared library. Therefore, a service in the kernel is substantially replicated in user mode through the use of shared libraries.

The term replication implies that system elements become separate extensions accessed through shared libraries as opposed to being replaced from an operating system. Hence, CSEs are generally not copies of a portion of the OS; they are an added additional service in the form of a CSE. Shared libraries are used as a mechanism where by an application can utilize a CSE that is part of a library. By way of example; a Linux based platform provides a TCP/IP stack in the Linux kernel. This invention provides a TCP/IP stack in the form of a CSE that is a different implementation of a TCP/IP stack, from Berkeley Software Distribution (BSD) by way of example. Applications on a Linux platform may use a BSD TPC/IP stack in the form of a CSE. The mechanism for attaching the BSD TCP/IP stack to an application is in the form of a shared library. Shared libraries as opposed to being copies from the OS to another space are a distinct implementation of the service (i.e. TCP/IP) packaged in the form of a shared library capable of executing in user mode linked to an application.

In a broad sense, the TCP/IP services in the CSE are the same as those provided in the Linux kernel. The reason two of these service may be required is to allow an application to utilize network services provided by a TCP/IP stack, that have unique configuration or settings for the application. Or the setting used by one application may conflict with the settings needed by another application. If, by way of example, a first application requires that specific network packets using a range of port numbers be passed to itself, it would need to configure route information to allow the TCP/IP stack to process these packets accordingly. On the same platform a second application is then exposed to either undesirable performance issues or security risks by allowing network packets with a broad port number range to be processed by the TCP/IP stack. In another scenario the configuration/settings established to support one application may have an adverse effect on the system as a whole.

By way of introduction, a number of terms will now be defined.

Critical System Element (CSE): Any service or part of a service, "normally" supplied by an operating system, that is critical to the operation of a software application.

A CSE is a dynamic object providing some function that is executing instructions used by applications.

BY WAY OF EXAMPLE CSEs INCLUDE:

Network services including TCP/IP, Bluetooth, ATM; or message passing protocols

File System services that offer extensions to those supplied by the OS
  1. Access files that reside in different locations as though they were all in a single locality
  2. Access files in a compressed, encrypted or packaged image as though they were in a local directory in a standard format Implementation of file system optimizations for specific application behavior Implementation of network optimizations for specific application services such as:
  1. Kernel bypass where hardware supported protocol processing is provided
  2. Modified protocol processing for custom hardware services Compute platform: The combination of computer hardware and a single instance of an operating system.

User mode: The context in which applications execute.

Kernel mode: The context in which the kernel portion of an operating system executes. In conventional systems, there is a physical separation enforced by hardware between user mode and kernel mode. Application code cannot run in kernel mode.

Application Programming Interface (API): An API refers to the operating system and programming language specific functions used by applications. These are typically supplied in libraries which applications link with either when the application is created or when the application is loaded by the operating system. The interfaces are described by header files provided with an operating system distribution. In practice, system APIs are used by applications to access operating system services.

Application library: A collection of functions in an archive format that is combined with an application to export system elements.

Shared library: An application library code space shared among all user mode applications. The code space is different than that occupied by the kernel and its associated files. The shared library files are placed in an address space that is accessible to multiple applications.

Static library: An application library whose code space is contained in a single application.

Kernel module: A set of functions that reside and execute in kernel mode as extensions to the operating system kernel. It is common in most systems to include kernel modules which provide extensions to the existing operating system kernel.

Up call mechanism: A means by which a service in kernel mode executes a function in a user mode application context.

Figure 1:
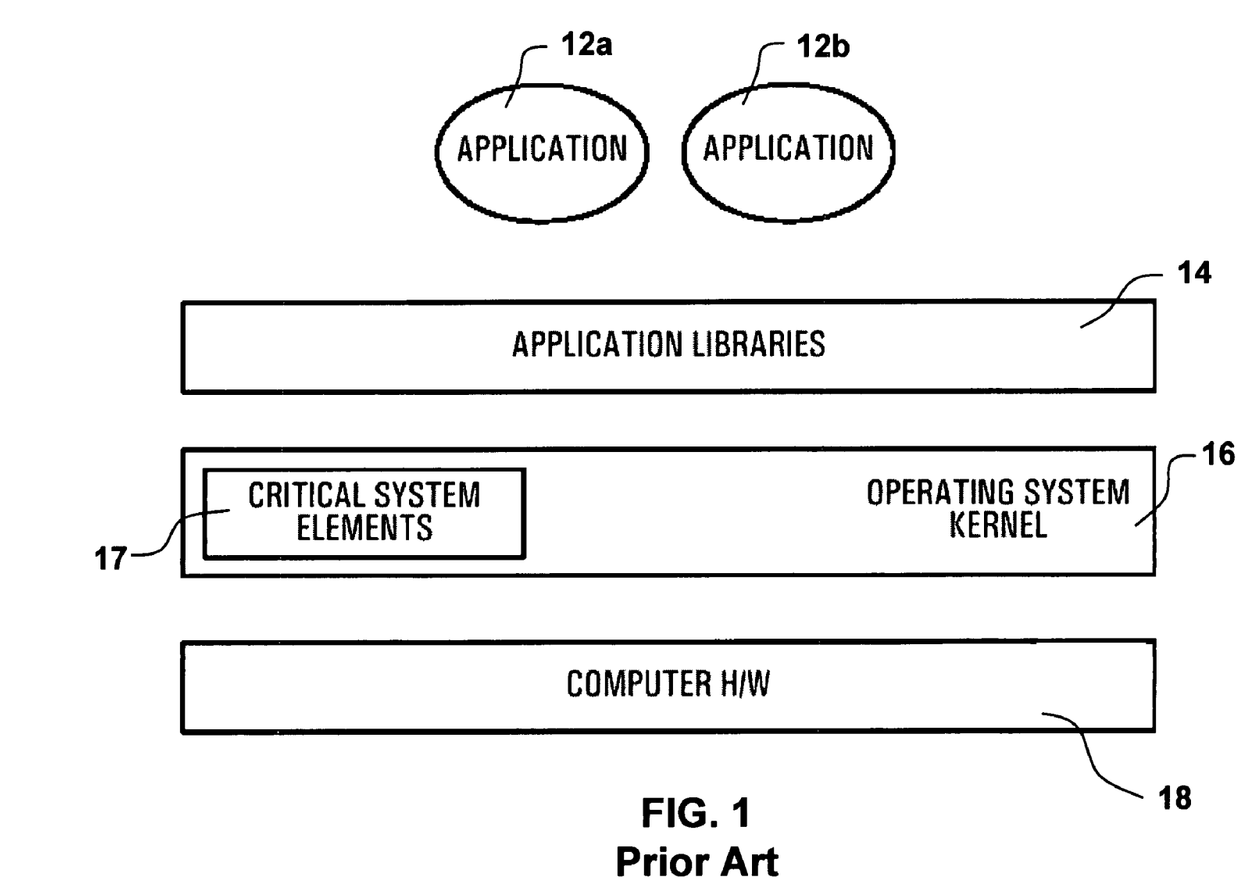
FIG. 1 is an architectural view of the traditional monolithic prior art operating system.

FIG. 1 shows a conventional architecture where critical system elements execute in kernel mode. Critical system elements are contained in the operating system kernel. Applications access system elements through application libraries.

In order for an application of FIG. 1 to make use of a critical system element 17 in the kernel 16, the application 12a or 12b makes a call to the application libraries 14. It is impractical to write applications, which handle CPU specific/operating specific issues directly. As such, what is commonly done is to provide an application library in shared code space, which multiple applications can access. This provides a platform independent interface where applications can access critical system elements. When the application 12a, 12b makes a call to a critical system element 17 through the application library 14, a system call may be used to transition from user mode to kernel mode. The application stops running as the hardware 18 enters kernel mode. The processor makes the transition to a protected/privileged mode of execution called kernel mode. Code supplied by the OS in the form of a kernel begins execution when the transition is made. The application code is not used when executing in kernel mode. The operating system kernel then provides the required functionality. It is noted that each oval 12a, 12b in FIG. 1 represents a different context. There are two application contexts in the illustrated example and the operating system context is not shown as an oval but also has its own context. There are many examples of this architecture in the prior art including SUN Solaris™, IBM AIX™, HP-UX™ and Linux™.

Figure 2A:
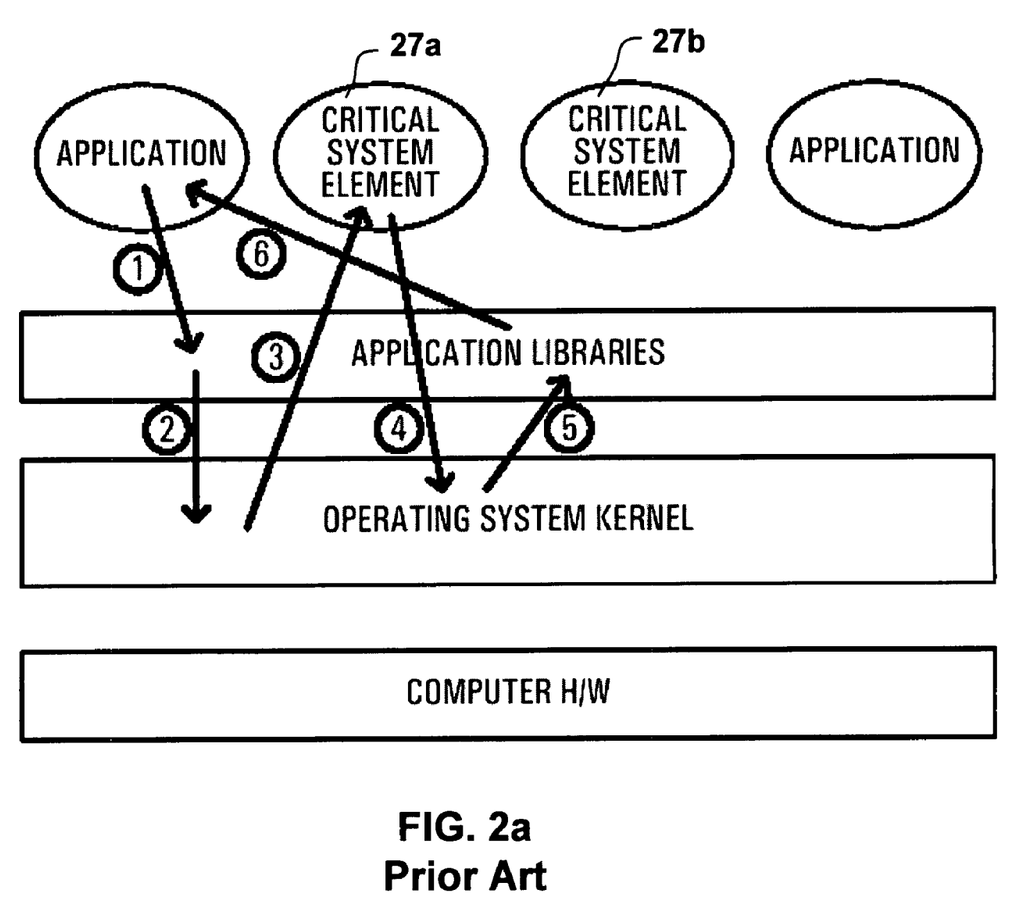
FIG. 2a is an architectural view of a multi-server operating system in which some critical system elements are removed from the operating system kernel and are placed in multiple distinct processes or servers.

FIG. 2a shows a system architecture where critical system elements 27a, 27b execute in user mode but in a distinct context from applications. Some critical system elements are removed from the operating system kernel. They reside in multiple distinct processes or servers. An example of the architecture described in FIG. 2a is the GNU Hurd operating system.

The servers that export critical system elements execute in a context distinct from the operating system kernel and applications. These servers operate at a peer level with respect to other applications. Applications access system elements through application libraries. The libraries in this case communicate with multiple servers in order to access critical system elements. Thus, in the illustrated example, there are two application contexts and two critical system element contexts. When an application requires the use of a critical system element, which is being run in user mode, a sequence of events must take place. Typically the application first makes a platform independent call to the application library. The application library in turn makes a call to the operating system kernel. The operating system kernel then schedules the server with the critical system element in a different user mode context. After the server completes the operation, a switch back to kernel mode is made which then responds back to the application through the application library. Due to this architecture, such implementations may result in poor performance. Ideally, an application, which runs on the system of FIG. 1, should be able to run on the system of FIG. 2a as well. However, in practice it is difficult to maintain the same characteristics and performance using such an architecture.

Figure 2B:
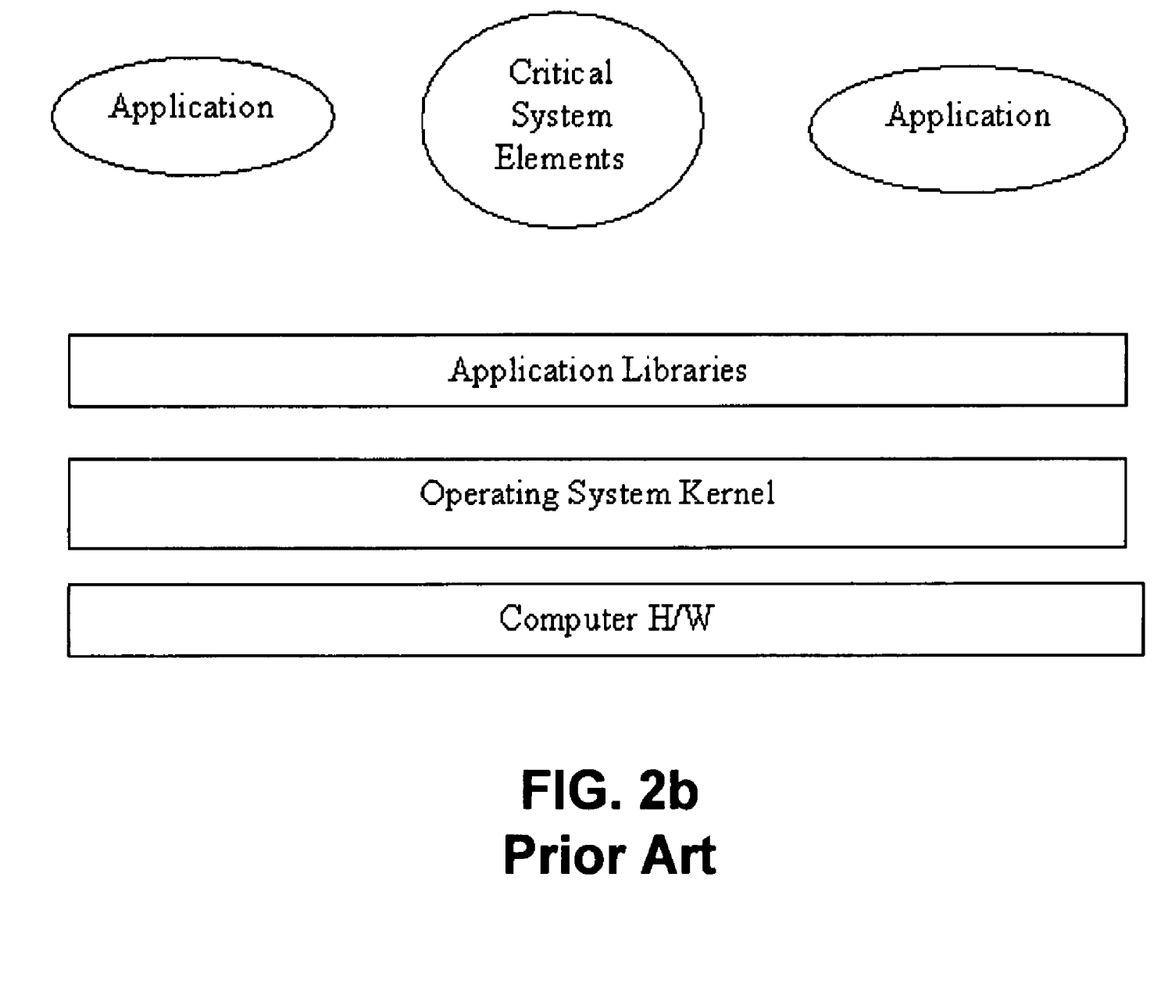
FIG. 2b is illustrative of a known system architecture where critical system elements execute in user mode and execute in distinct context from applications in a single application process context.

FIG. 2b is illustrative of a known system architecture where critical system elements execute in user mode. The critical system elements also execute in a distinct context from applications. Some critical system elements are removed from the operating system kernel. The essential difference between the architecture described in FIG. 2a and FIG. 2b is the use of a single process context to contain all user mode critical system elements. An example of the architecture described in FIG. 2b is Apple's MAC OS X™.

This invention is contrasted with all three of the prior art examples. Critical system elements as defined in the invention are not isolated in the operating system kernel as is the case of a monolithic architecture shown in FIG. 1; also they are not removed from the context of an application, as is the case with a multi-server architecture depicted in FIG. 2a. Rather, they are replicated, and embodied in the context of an application.

Figure 3:
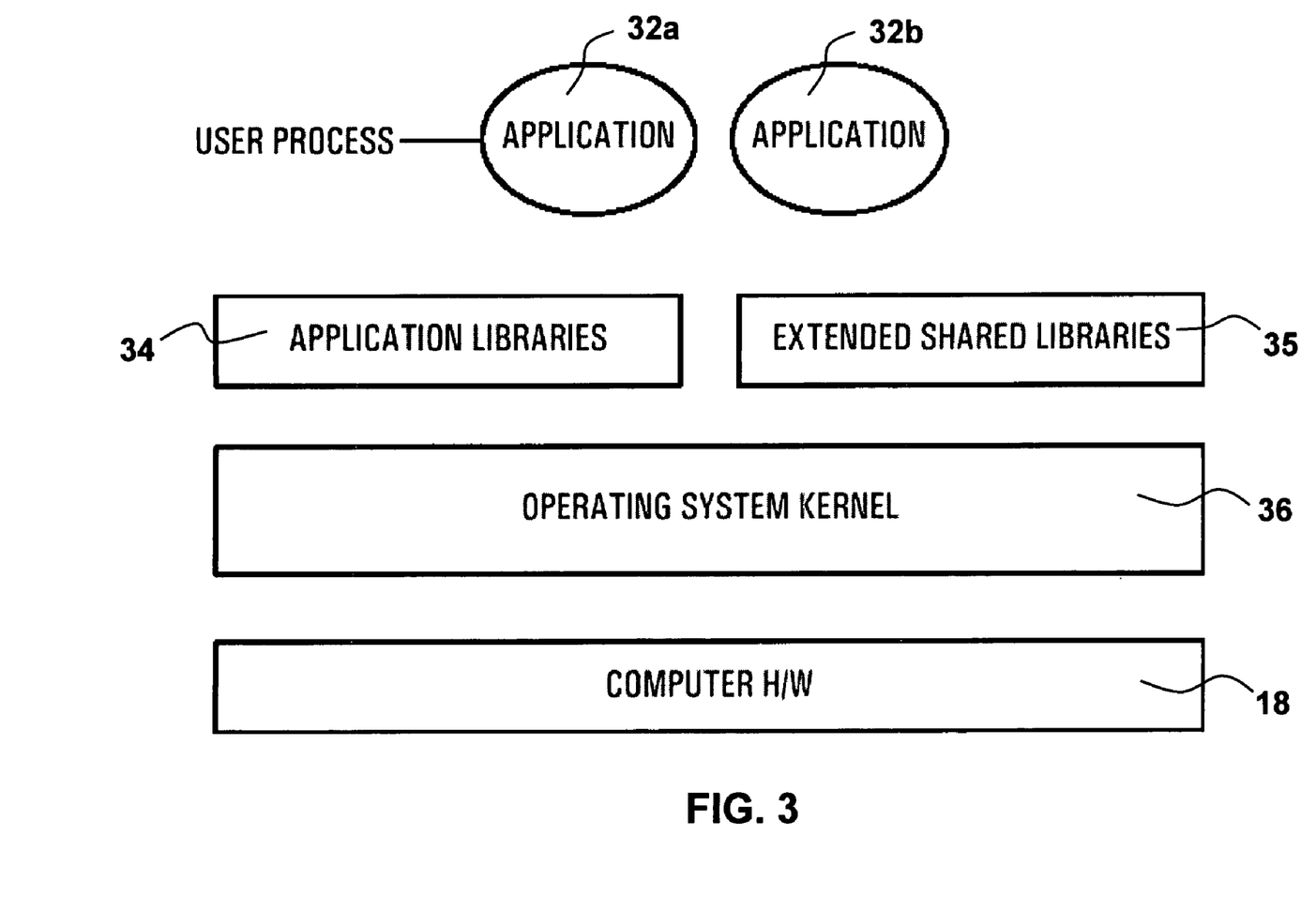
FIG. 3 is an architectural view of an embodiment of the invention.

FIG. 3 shows an architectural view of the overall operation of this invention. Multiple user processes execute above a single instance of an operating system.

Software applications 32a, 32b, utilize shared libraries 34 as is done in U.S. Provisional Patent Application Ser. No. 60/512,103 entitled "SOFTWARE SYSTEM FOR CONTAINERIZATION OF APPLICATION SETS" which is incorporated herein by reference. The standard libraries are augmented by an extension, which contains critical system elements, that reside in extended shared libraries 35. Extended services are similar to those that appear in the context of the operating system kernel 36.

Figure 4:
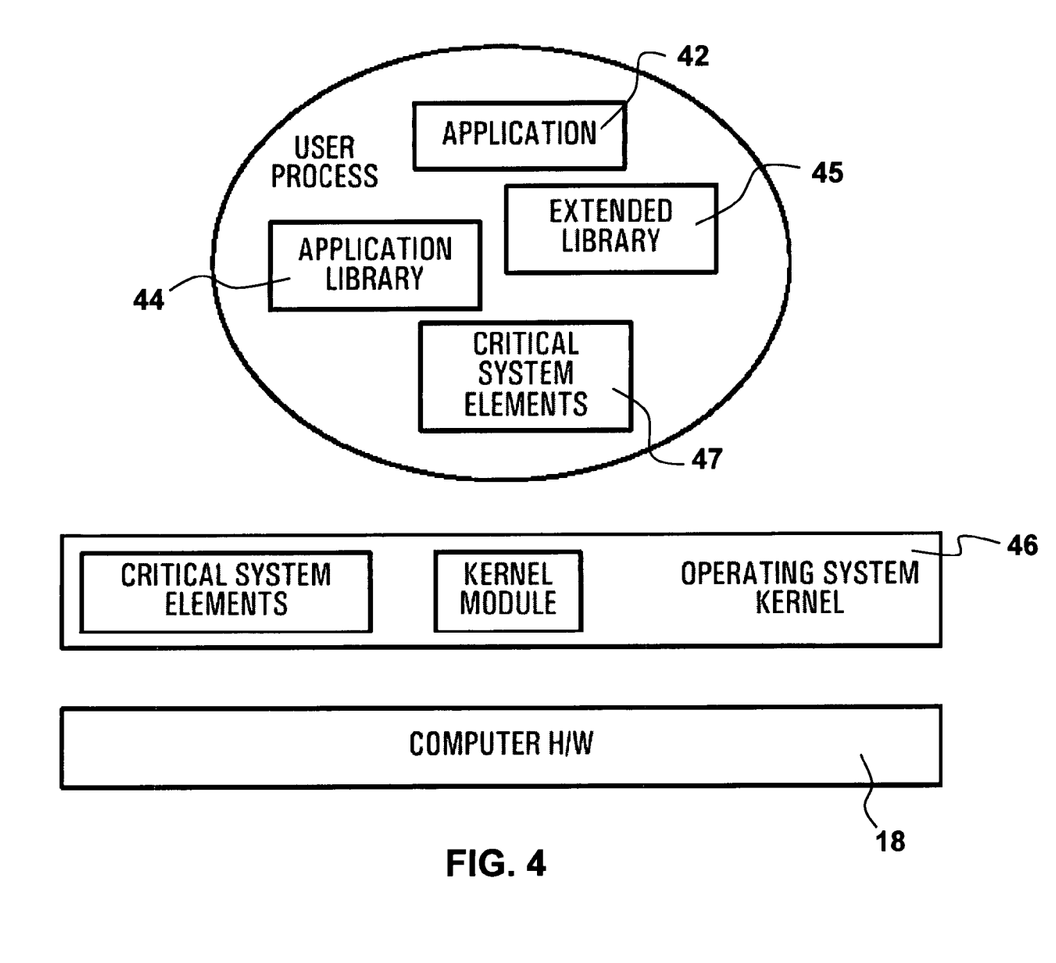
FIG. 4 is a functional view showing how critical system elements exist in the same context as an application.

FIG. 4 illustrates the functionality of an application process as it exists above an operating system that was described in FIG. 3. Applications exist and run in user mode while the operating system kernel 46 itself runs in kernel mode. User mode functionality includes the user applications 42, the standard application libraries 44, and one or more critical system elements, 45 & 47. FIG. 4 shows one embodiment of the invention where the CSE functionality is contained in two shared libraries. An extended library, 45, provides control operations while the CSE shared library, 47, provides an implementation of a critical system element.

The CSE library includes replicas or substantial functional equivalents or replacements of kernel functions. The term replica, shall encompass any of these meanings, and although not a preferred embodiment, may even be a copy of a CSE that is part of the OS. These functions can be directly called by the applications 42 and as such can be run in the same context as the applications 42. In preferred embodiments, the kernel functions which are included in the extended shared library and critical system element library 45,47 are also included in the operating system kernel 46.

Furthermore, there might be different versions of a given critical system element 47 with different applications accessing these different versions within their respective context.

In preferred embodiments, the platform specific aspects of the critical system element are left in the operating system kernel. Then the critical system elements running in user mode may still make use of the operating system kernel to implement these platform specific functions.

Figure 5:
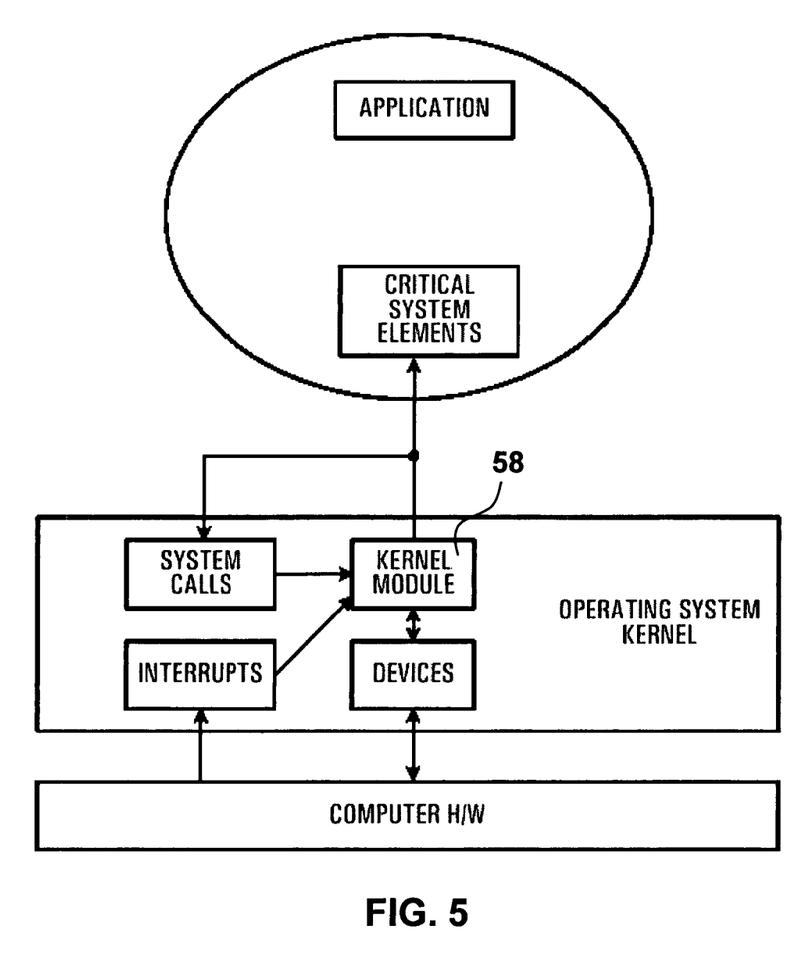
FIG. 5 is a block diagram showing a kernel module provided by an embodiment of the invention; and, FIG. 6 shows how interrupt handling occurs in an embodiment of the invention.

FIG. 5 represents the function of the kernel module 58, described in more detail below. A critical system element in the context of an application program uses system calls to access services in the kernel module. The kernel module serves as an interface between a service in the application context and a device driver. Specific device interrupts are vectored to the kernel module. A service in the context of an application is notified of an interrupt by the kernel module.

Figure 6:
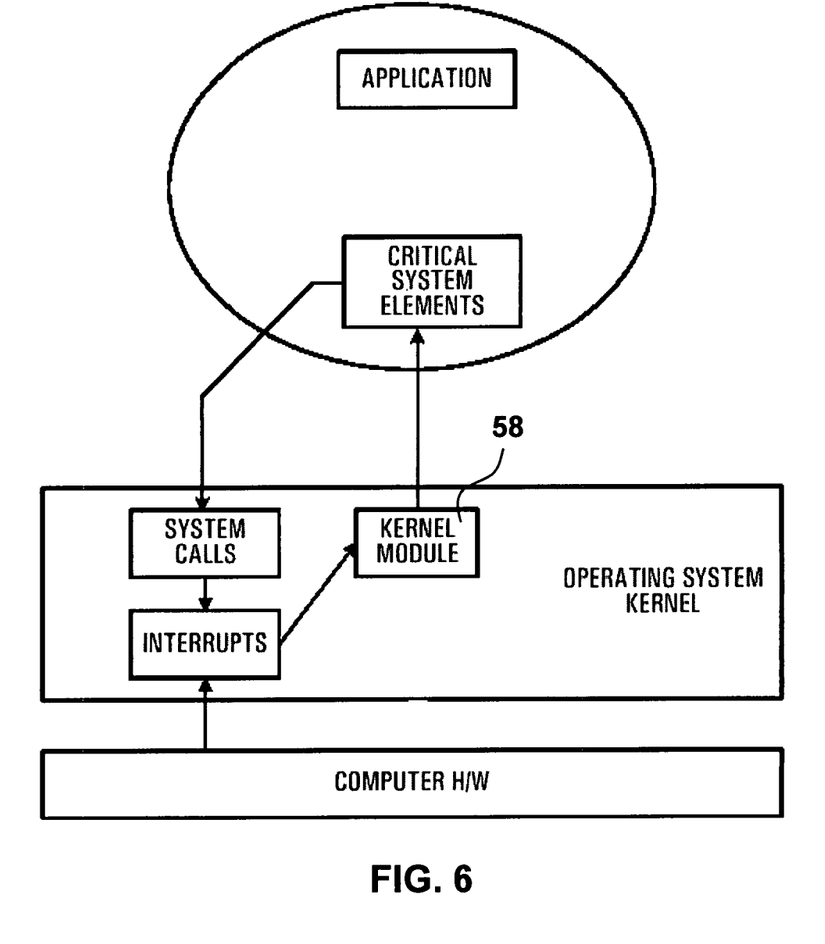

FIG. 6 represents interrupt handling. Interrupt handling is initialized through a system call. A handler contained in the kernel module 58 is installed for a specific device interrupt. When a hardware device generates an interrupt request the handler contained in the kernel module is called. The handler notifies a service in the context of an application through the use of an up call mechanism.

Function Overlays

A function overlay occurs when the implementation of a function that would normally be called, is replaced such that an extension or replacement function is called instead. The invention uses function overlays in one embodiment of the invention to intercept software application accesses to operating system services.

The overlay is accomplished by use of an ability supplied by the operating system to allow a library to be preloaded before other libraries are loaded. Such ability is used to cause the loading process, performed by the operating system to link the application to a library extension supplied by the invention rather than to the library that would otherwise be used. The use of this preload capability to attach a CSE to an application is believed to be novel.

The functions overlaid by the invention serve as extensions to operating system services. When a function is overlaid in this manner it enables the service defined by the API to be exported in an alternate manner than that provided by the operating system in kernel mode.

Critical System Elements

According to the invention, some system elements that are critical to the operation of a software application are replicated from kernel mode, into user mode in the same context as that of the application. These system elements are contained in a shared library. As such they are linked to a software application as the application is loaded. This is part of the operation performed when shared libraries are used. A linker/loader program is used to load and start an application. The process of starting the application includes creating a linkage to all of the required shared libraries that the application will need. The CSE is loaded and linked to the application as a part of this same process.

FIG. 3 shows that an extension library is utilized. In its native form, as it exists in the operating system kernel, a CSE uses services supplied by the operating system kernel. In order for the CSE to be migrated to user mode and operate effectively, the services that the CSE uses from the operating system kernel are replicated in user mode and contained in the shared library with the CSE itself. Services of the type referred to here include, but are not limited to, memory allocation, synchronization and device access. Preferably, as discussed above, platform specific services are not replicated, but rather are left in the operating system kernel. These will then be called by the critical system element running in user mode.

FIG. 4 shows that the invention allows for critical system elements to exist in the same context as an application. These services exported by library extensions do not replace those provided in an operating system kernel. Thus, in FIG. 4 the user process is shown to include the application itself, the regular application library, the extended library and the critical system element all of which are operating in user mode. The operating system kernel is also shown to include critical system elements. In preferred embodiments, the critical system elements which are included in user mode are replicas of elements which are still included in the operating system kernel. The term replication means that like services are supplied. As was described heretofore, it is not necessarily the case that duplicates of the same implementation found in the kernel are provided by a CSE; but essentially a same functionality is provided. As discussed previously, different applications may be provided with their own versions of the critical system elements.

Kernel Module

In some embodiments, control code is placed in kernel mode as shown in FIG. 4. FIG. 5 shows that a kernel module is used to augment device access and interrupt notification. As a device interface the kernel module enables data exchange between a user mode CSE and a device driver in kernel mode. The exchange uses mapping of virtual memory such that data is transferred in both directions without a copy. Services exported for device interface typically include:

1. Initialization.
2. Establish a channel between a CSE in user mode and a specific device.
3. Informs the interrupt service that this CSE requires notification.
4. Write data.
5. Transfer data from a CSE to a device.
6. User mode virtual addresses are converted to kernel mode virtual addresses.
7. Read data.
8. Transfer data from a device to a CSE.
9. Kernel mode data is mapped into virtual addresses in user mode.
10. During initialization, interrupt services are informed that for specific interrupts, they should call a handler in the kernel module. The kernel module handles the interrupt by making an up call to the critical system element. Interrupts related to a device being serviced by a CSE in user mode are extended such that notification is given to the CSE in use.

As shown in FIG. 6 a handler is installed in the path of an interrupt. The handler uses an up call mechanism to inform the affected services in user mode. A user mode service enables interrupt notification through the use of an initialization function.

The general system configuration of the present invention discloses one possible implementation of the invention. In some embodiments, the 'C' programming language is used but other languages can alternatively be employed. Function overlays have been implemented through application library pre-load. A library supplied with the invention is loaded before the standard libraries, using standard services supplied by the operating system. This allows specific functions (APIs) used by an application to be overlaid or intercepted by services supplied by the invention. Access from a user mode CSE to the kernel module, for device I/O and registration of interrupt notification, is implemented by allowing the application to access the kernel module through standard device interfaces defined by the operating system. The kernel module is installed as a normal device driver. Once installed applications are able to open a device that corresponds to the module allowing effective communication as with any other device or file operation. Numerous modifications and variations of the present invention are possible in light of the above teachings without departing from the spirit and scope of the invention.

It is therefore to be understood that within the scope of the appended claims, the invention may be practiced otherwise than as specifically described herein.

What is claimed is:

1. A computing system for executing a plurality of software applications comprising:
   a) a processor;
   b) an operating system having an operating system kernel having OS critical system elements (OSCSEs) for running in kernel mode using said processor; and,
   c) a shared library having shared library critical system elements (SLCSEs) stored therein for use by the plurality of software applications in user mode and
   i) wherein some of the SLCSEs stored in the shared library are functional replicas of OSCSEs and are accessible to some of the plurality of software applications and when one of the SLCSEs is accessed by one or more of the plurality of software applications it forms a part of the one or more of the plurality of software applications,
   ii) wherein an instance of a SLCSE provided to at least a first of the plurality of software applications from the shared library is run in a context of said at least first of the plurality of software applications without being shared with other of the plurality of software applications and where at least a second of the plurality of software applications running under the operating system have use of a unique instance of a corresponding critical system element for performing same function, and iii) wherein a SLCSE related to a predetermined function is provided to the first of the plurality of software applications for running a first instance of the SLCSE, and wherein a SLCSE for performing a same function is provided to the second of the plurality of software applications for running a second instance of the SLCSE simultaneously.

2. A computing system as defined in claim 1, wherein in operation, multiple instances of an SLCSE stored in the shared library run simultaneously within the operating system.

3. A computing system according to claim 1 wherein OSCSEs corresponding to and capable of performing the same function as SLCSEs remain in the operating system kernel.

4. A computing system according to claim 1 wherein the one or more SLCSEs provided to one of the plurality of software applications having exclusive use thereof, use system calls to access services in the operating system kernel.

5. A computing system according to claim 1 wherein the operating system kernel comprises a kernel module adapted to serve as an interface between an SLCSE in the context of an application program and a device driver.

6. A computing system according to claim 5 wherein the kernel module is adapted to provide a notification of an event to an SLCSE running in the context of an application program, wherein the event is an asynchronous event and requires information to be passed to the SLCSE from outside the application.

7. A computing system according to claim 6 wherein a handler is provided for notifying the SLCSE in the context of one of the plurality of software applications through the use of an up call mechanism.

8. A computing system according to claim 7 wherein the up call mechanism in operation, executes instructions from an SLCSE resident in user mode space, in kernel mode.

9. A computing system according to claim 2, wherein a function overlay is used to provide one of the plurality of software applications access to operating system services.

10. A computing system according to claim 2 wherein SLCSEs stored in the shared library are linked to particular software applications of the plurality of software applications as the particular software applications are loaded such that the particular software applications have a link that provides unique access to a unique instance of a CSE.

11. A computing system according to claim 2 wherein the SLCSEs utilize kernel services supplied by the operating system kernel for device access, interrupt delivery, and virtual memory mapping.

12. A computing system according to claim 1, wherein SLCSEs include services related to at least one of, network protocol processes, and the management of files.

13. A computing system according to claim 10 wherein some SLCSEs are modified for a particular one of the plurality of software applications.

14. A computing system according to claim 13 wherein the SLCSEs that are application specific, reside in user mode, while critical system elements, which are platform specific, reside in the operating system kernel.

15. A computing system according to claim 5 wherein the kernel module is adapted to enable data exchange between the SLCSEs in user mode and a device driver in kernel mode, and wherein the data exchange uses mapping of virtual memory such that data is transferred both from the SLCSEs in user mode to the device driver in kernel mode and from the device driver in kernel mode to the SLCSEs in user mode.

16. A computing system according to claim 1 wherein SLCSEs form a part of at least some of the plurality of software applications, by being linked thereto.

17. A computing system according to claim 2 wherein the SLCSEs utilize kernel services supplied by the operating system kernel for device access, interrupt delivery, and virtual memory mapping and otherwise execute without interaction from the operating system kernel.

18. A computer system as defined in claim 2 wherein SLCSEs are not copies of OSCSEs.

* * * * *